(12) United States Patent
Reynolds et al.

(10) Patent No.: US 8,978,628 B2

(45) Date of Patent: Mar. 17, 2015

(54) ENGINE COOLING SYSTEM

(71) Applicant: The Boeing Company, Chicago, IL (US)

(72) Inventors: Travis Allen Reynolds, Everett, WA (US); David S. Krug, Kirkland, WA (US); Michelle Louise Courtney, Bothell, WA (US)

(73) Assignee: The Boeing Company, Chicago, IL (US)

( * ) Notice: Subject to any disclaimer, the term of this patent is extended or adjusted under 35 U.S.C. 154(b) by 28 days.

(21) Appl. No.: 13/911,485

(22) Filed: Jun. 6, 2013

(65) Prior Publication Data

US 2014/0360445 A1     Dec. 11, 2014

(51) Int. Cl.
   *F01P 3/00*         (2006.01)
   *F02B 29/04*      (2006.01)

(52) U.S. Cl.
   CPC .............. *F01P 3/00* (2013.01); *F02B 29/0462* (2013.01)
   USPC ..................... 123/563; 123/41.04; 123/41.02; 123/41.51

(58) Field of Classification Search
   CPC ............... F01P 7/02; F01P 7/026; F01P 7/12; B01D 53/02; B01D 53/30
   USPC ........... 123/41.44, 563, 41.03–41.05; 96/113
   See application file for complete search history.

(56) References Cited

U.S. PATENT DOCUMENTS

| | | | |
|---|---|---|---|
| 3,752,422 A | | 8/1973 | Runnels et al. |
| 4,236,492 A | * | 12/1980 | Tholen ......................... 123/563 |
| 4,779,577 A | * | 10/1988 | Ritter et al. ................ 123/41.05 |
| 5,709,103 A | | 1/1998 | Williams |
| 6,142,108 A | * | 11/2000 | Blichmann ................ 123/41.05 |
| 6,981,388 B2 | * | 1/2006 | Brutscher et al. ............... 62/401 |
| 7,849,702 B2 | | 12/2010 | Parikh |
| 2002/0152765 A1 | | 10/2002 | Sauterleute et al. |
| 2004/0014419 A1 | | 1/2004 | Lents et al. |
| 2004/0065308 A1 | * | 4/2004 | Bryant .......................... 123/562 |
| 2011/0259546 A1 | | 10/2011 | DeFrancesco et al. |

FOREIGN PATENT DOCUMENTS

| | | |
|---|---|---|
| EP | 2219946 | 9/2011 |
| GB | 768975 | 2/1957 |
| WO | 2005/063564 | 7/2005 |

OTHER PUBLICATIONS

International Search Report, International Application No. PCT/US2007/084550 (Sep. 30, 2008).

(Continued)

*Primary Examiner* — Lindsay Low
*Assistant Examiner* — Kevin Lathers
(74) *Attorney, Agent, or Firm* — Thompson Hine LLP

(57) ABSTRACT

An engine cooling system may include a housing forming an enclosed duct having an air intake opening, at least one heat exchanger positioned within the duct such that ambient air entering the air intake opening contacts the at least one heat exchanger, at least one radiator circulating coolant for the engine, at least one radiator positioned in the duct such that ambient air entering the air intake opening contacts at least one radiator, and the duct configured to include an exhaust opening positioned downstream of the at least one heat exchanger and the at least one radiator, such that ambient air flows in the air intake opening, through the duct to contact the heat exchanger and the radiator, and exits the duct through the exhaust opening.

13 Claims, 3 Drawing Sheets

(56) References Cited

OTHER PUBLICATIONS

International Preliminary Report on Patentability, International Application No. PCT/US2007/084550 (May 18, 2010).

EPO, Decision to Grant a European Patent, European Application No. 07874271.5 (EP 2219946) (Aug. 25, 2011).
EPO, Communication regarding Opposition, European Application No. 07874271.5 (EP 2219946) (Sep. 3, 2013).

* cited by examiner

ENGINE COOLING SYSTEM

FIELD

The present disclosure relates to engine cooling systems and, more particularly, to engine cooling systems for use onboard aircraft and other vehicles.

BACKGROUND

To function properly at altitude, where air pressure is relatively low, internal combustion engines onboard vehicles, such as aircraft, use intake air and cooling air to be conditioned for proper engine function. Such engines use a compressor to increase the mass of flow rate of air to the engine intake. Because a compressor increases the temperature of the charge air, the engine intake also includes an intercooler or heat exchanger to cool the compressed air. Further, such engines may include one or more radiators to dissipate engine heat during operation.

However, if an intercooler undercools the charge air to an engine, such undercooled air can adversely affect the performance of the engine. Conversely, if the operation of the intercooler rejects excessive amounts of heat absorbed by the radiator that circulates coolant for the engine, the performance of that radiator, and hence the engine, may be adversely affected. In addition, such engines need to be capable of operation at low altitude or ground, where the aircraft is moving at a relatively low velocity, or is stationary. Accordingly, there is a need for a compact engine cooling system for an aircraft that is sufficiently flexible to provide intake air and cooling air for an engine at a preferred temperature range at both in flight and stationary on ground conditions.

SUMMARY

In an embodiment, an engine cooling system may include a housing forming an enclosed duct having an air intake opening, at least one heat exchanger positioned within the duct such that ambient air entering the air intake opening contacts the at least one heat exchanger, at least one radiator circulating coolant for the engine, the at least one radiator positioned in the duct such that ambient air entering the air intake opening contacts the at least one radiator, and the duct configured to include an exhaust opening positioned downstream of the at least one heat exchanger and the at least one radiator, such that ambient air flows in the air intake opening, through the duct to contact the heat exchanger and the radiator, and exits the duct through the exhaust opening.

In another embodiment, an aircraft may include an engine, a compartment having an enclosed duct, the duct having an air intake opening to ambient air and an exhaust opening to ambient air aft of the intake opening, at least one heat exchanger positioned within the duct such that ambient air entering the air intake opening contacts the at least one heat exchanger, at least one radiator positioned within the duct and configured to circulate coolant for the engine, and the duct configured to include an exhaust opening positioned downstream of the at least one heat exchanger and the at least one radiator, such that ambient air flows in the air intake opening, through the duct to contact the heat exchanger and radiator, and exits the duct through the exhaust opening.

In yet another embodiment, a method for cooling an engine may include providing a housing forming an enclosed duct having an air intake opening and an exhaust opening, placing at least one heat exchanger within the duct, connecting the at least one heat exchanger to condition combustion air in a combustion air intake line to the engine, placing at least one radiator configured to circulate coolant for the engine within the duct, and modulating an amount of ambient air flowing through the duct to maintain temperatures of the combustion air and the coolant within preferred temperature ranges.

Other objects and advantages of the disclosed method and system for engine cooling will be apparent from the following description, the accompanying drawings and the appended claims.

DETAILED DESCRIPTION

Figure 1:
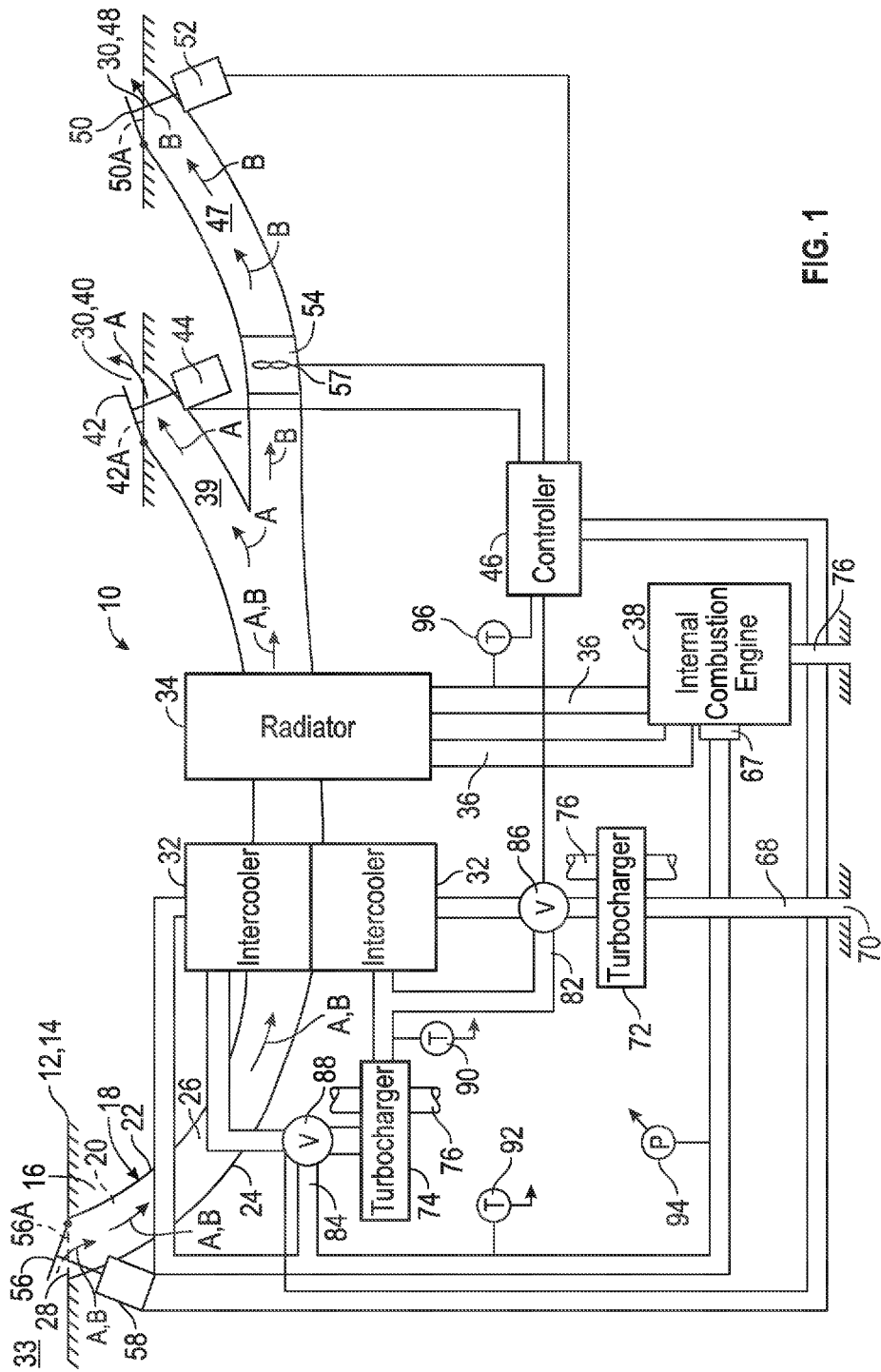
FIG. 1 is a schematic side elevation of an embodiment of the disclosed engine cooling system.

As shown in FIG. 1, engine cooling system, generally designated 10, may be mounted in a vehicle, such as in the fuselage 12 of an aircraft 14. In the embodiment shown, the cooling system 10 may be mounted in a compartment 16 of the aircraft 14, which in an embodiment may be a tail cone. In embodiments, the aircraft 14 may be a jet aircraft, a propeller driven aircraft, a helicopter, a lighter than air aircraft, and the like. In embodiments, the vehicle represented as an aircraft 14 in FIG. 1 may be selected from a land vehicle, an amphibious vehicle, a marine vehicle, and a submarine vehicle, each having a compartment 16 containing the cooling system 10.

The engine cooling system 10 may include a housing, generally designated 18, having opposing side walls 20 (only one of which is shown), a top wall 22 and a bottom wall 24. Walls 20, 22, 24 may form an enclosed duct 26 having an air intake opening 28 and an exhaust opening, generally designated 30. In an embodiment, the duct 26 may be substantially round in cross section, or may have a shape selected to fit the compartment 16 in which it is placed.

Figure 3:
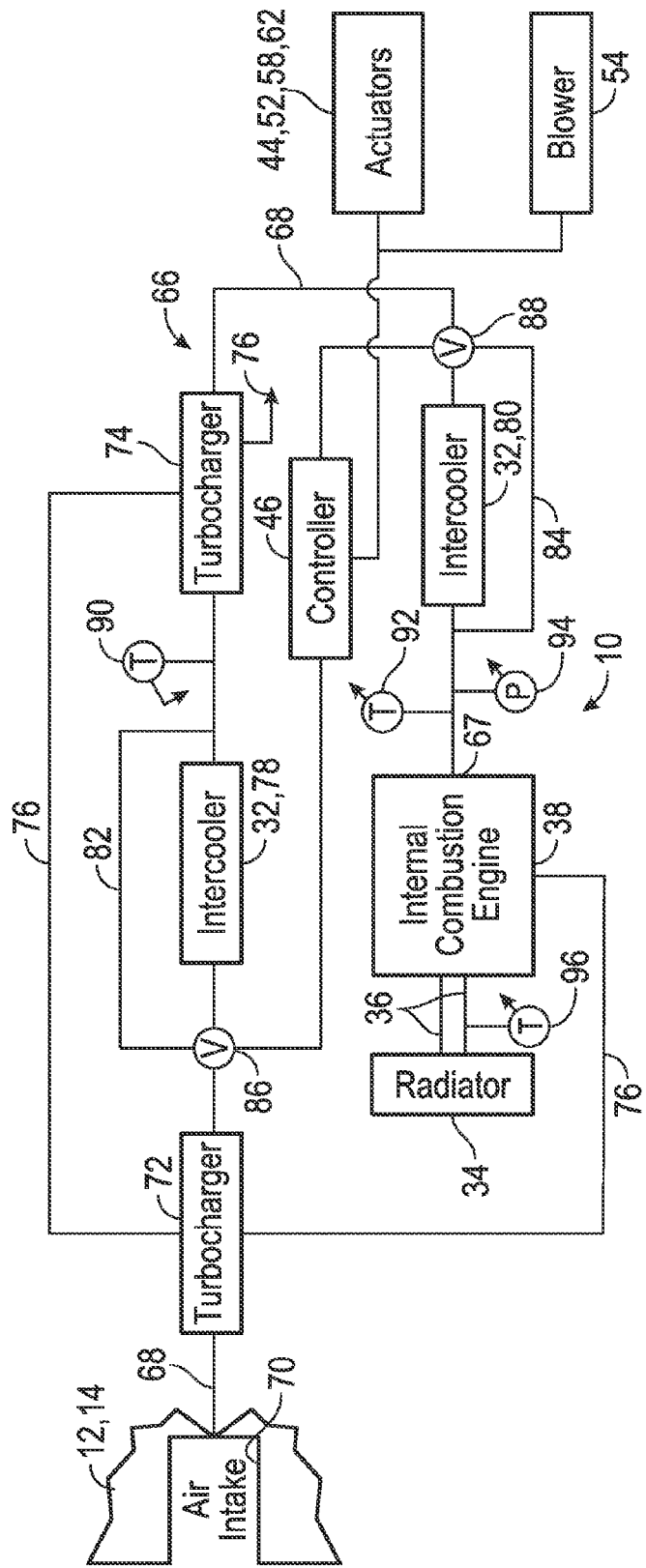
FIG. 3 is a schematic of the charge air system of the disclosed engine cooling system.

At least one heat exchanger, which in the embodiment of FIG. 1 may take the form of an intercooler 32, may be positioned within the duct 26 such that air from the ambient 33 entering the air intake opening 28 may contact the at least one heat exchanger 32. In the embodiment shown in FIG. 1, the at least one heat exchanger 32 may include two heat exchangers 32 positioned in parallel in the duct 26. In other embodiments, more than two heat exchangers 32 may be positioned in the duct 26. In an embodiment, the heat exchangers 32 may be arranged in series in the duct 26. At least one radiator 34 may be positioned in the duct 26 downstream of the heat exchangers 32. In another embodiment, at least the radiator 34 may include two radiators positioned in parallel. In other embodiments, the radiator 34 may be arranged in series in the duct 26. As shown in FIGS. 1 and 3, the radiator 34 may be connected by a coolant line 36 to circulate coolant to an internal combustion engine 38.

As shown in FIG. 1, the duct 26 may be configured such that the exhaust opening 30 may be positioned downstream of the heat exchangers 32 and radiator 34, such that ambient air flowing into the air intake opening 28 may flow through the duct to contact the heat exchanger and the radiator, and exit the duct through the exhaust opening.

In an embodiment, the exhaust opening 30 may include a passive flow duct segment 39, which may comprise a terminal branch of the duct 26. The exhaust opening 30 may include a passive flow exhaust opening 40 communicating with the passive flow duct segment 39. The passive flow exhaust opening 40 may include a positionable passive flow exhaust door 42 configured to modulate air flow through the duct 26 and duct segment 39. The passive flow exhaust door 42 may be positioned by an actuator 44 that is activated by a controller 46 (see also FIG. 3).

The exhaust opening 30 may include a motive flow duct segment 47, which may comprise a terminal branch of the duct 26. The exhaust opening 30 may include a motive flow exhaust opening 48 communicating with the motive flow exhaust duct segment 47. The motive flow exhaust opening 48 may include a positionable motive flow exhaust door 50 configured to modulate air flow through the duct 26 and motive flow duct segment 47. The motive flow exhaust door 50 may include an actuator 52 that may be activated by the control 46 (see also FIG. 3). The actuators 44, 52 may be configured to position the passive flow exhaust door 42 and motive flow exhaust door 48, respectively, individually between closed configurations, in which no air may flow through the associated exhaust openings 40, 48, respectively, to open configurations, namely, to varying degrees of being open.

The cooling system 10 also may include a blower 54, which in an embodiment may be in the form of a fan. In other embodiments, the blower 54 may comprise any type of air moving device. The blower 54 may be located within the duct 26 at a location downstream of the heat exchanger 32 and radiator 34, and upstream of the exhaust opening 48. In an embodiment, the blower may be located in the motive flow duct segment 47. The blower 54 may be actuated by the controller 46.

The duct 26 also may include a positionable intake door 56 configured to modulate air flow through the duct. The positionable intake door 56 may include an actuator 58 that may be activated by controller 46. Actuator 58 may position intake door 56 from a fully closed configuration, shown as intake door 56A in phantom, to a fully open configuration as shown in FIG. 1, as well as positions intermediate a fully closed and a fully open position. In an embodiment, the intake door 56 may be shaped to provide a smooth surface relative to the outer surface of the fuselage 12 of the aircraft 14 when positioned in a fully closed configuration.

As shown in FIG. 1, the engine cooling system 10 may be configured by the controller 46 to open the air intake door 56 and passive flow exhaust door 42 to open configurations, and modulate the motive flow exhaust door 50 to a closed configuration, shown as motive flow exhaust door 50A in phantom. In this configuration, ambient air entering the intake opening 28 may follow the direction of arrows A. Thus, air from the ambient 33 may enter the intake opening 28 of the duct 26 and travel across the intercoolers 32 and radiator 34, where the ambient air may pick up heat from the heat exchanger and radiator, then flow through passive flow duct segment 39 and exit the passive flow exhaust opening 40. Because the motive flow exhaust door 50A may be in a closed configuration, ambient air flowing through the duct 26 may not be able to flow through motive flow duct segment 47 and exit the motive flow exhaust opening 48, and thus may not flow across the blower 54. This may prevent "windmilling" of the turbine blade 57 of the blower 54.

The foregoing configuration of the engine cooling system 10 of FIG. 1 may be employed when the aircraft 14 is in flight. Under that condition, ambient air may be forced into the intake opening 28, and may be diverted into the intake opening by the shape and positioning of the open intake door 56. The controller 46 may vary the degree that the one or both of the intake door 56 and passive flow exhaust door 42 may be open in order to modulate the mass flow rate of ambient air across the intercoolers 32 and radiator 34 in order to vary the heat transfer from the intercoolers 32 and radiator 34 to the ambient air in the duct 26 to maintain the temperatures of the fluids within the intercoolers and radiator within preferred temperature ranges, while minimizing the amount of excrescence drag from the open doors 56, 42.

As shown in FIG. 1, the engine cooling system 10 may be configured by the control 46 to modulate the motive flow exhaust door 50 to an open configuration, and the passive flow exhaust door 42A to the closed configuration. This may prevent ambient air flowing into the duct 26 through the intake opening 28 from flowing through the passive flow duct segment 39 and exiting the passive flow exhaust opening 40, and instead direct it to the motive flow duct segment 47 and motive flow exhaust opening 48, as shown by the arrows B. In this configuration, the intake door 56 may be modulated to an open configuration and the blower 54 may be actuated by the control 46. The action of the blower 54 may draw air from the ambient 33 in through the intake opening 28, through the duct 26 and across the intercoolers 32 and radiator 34 before flowing through the motive flow duct segment 47 and exiting the motive flow exhaust opening 48.

The foregoing configuration of the cooling system 10 may be employed when the associated aircraft 14 is on the ground and the relative velocity of ambient air through the duct 26 otherwise may be insufficient to provide the desired cooling effect on the intercoolers 32 and radiator 34. Further, this configuration may be used when the associated aircraft 14 may be flying at low altitudes and/or when the ambient air 33 is at an elevated temperature.

Figure 2:
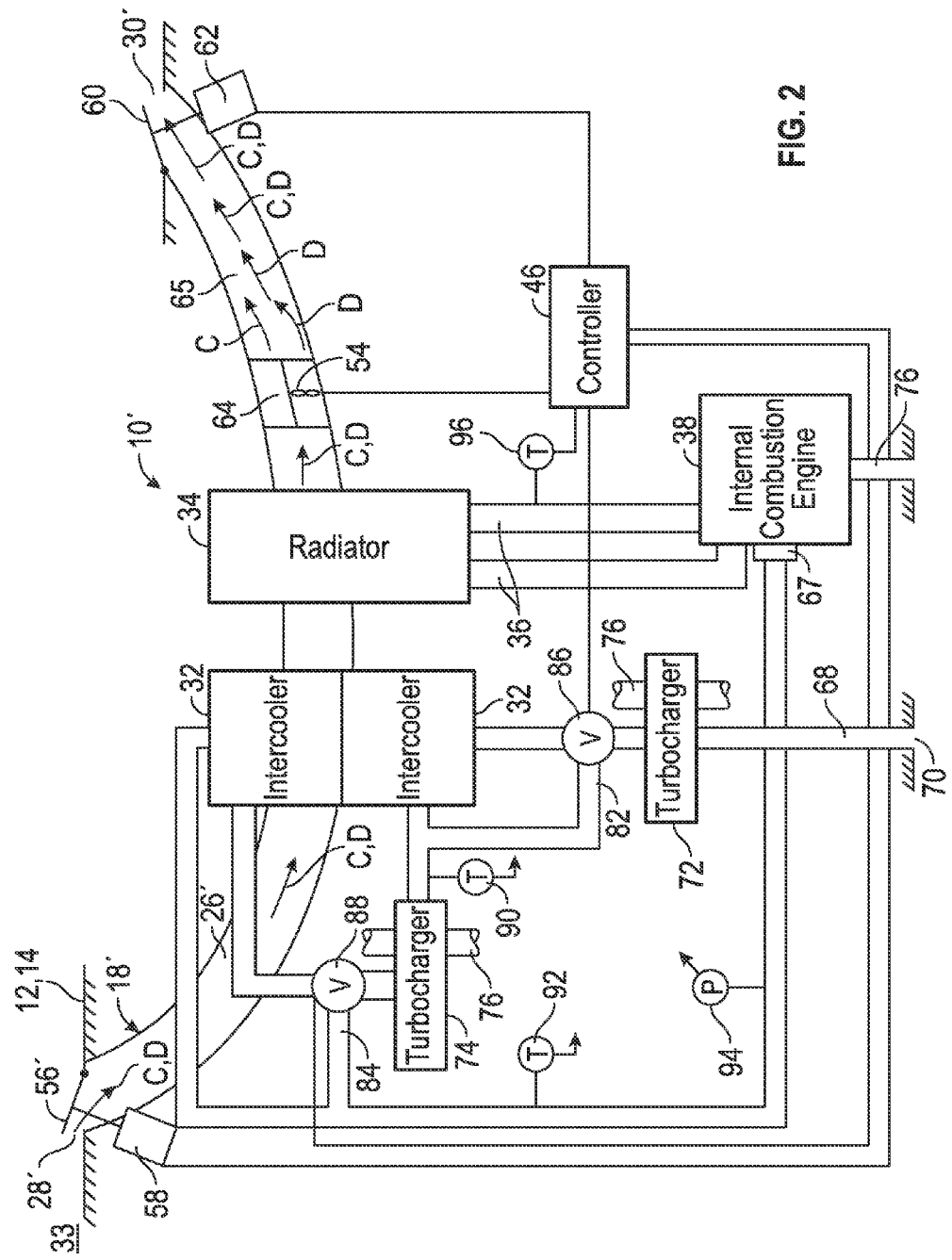
FIG. 2 is a schematic side elevation of another embodiment of the disclosed engine cooling system.

As shown in FIG. 2, in an alternate embodiment of the engine cooling system 10', the housing 18' may form a duct 26' having an intake opening 28' that may be selectively opened and closed by an intake door 56', and further may include an exhaust opening 30 having a positionable exhaust door 60 that may be positioned by an actuator 62 controlled by the controller 46 to selectively position the exhaust door 60 to a closed configuration, in which all or substantially all air flow through duct 26' is shut off, to the open configuration shown by door 60, in which air in the duct is permitted to exit the exhaust opening 30'. A check valve 64 may be positioned within the duct 26' and arranged in parallel with the blower 54.

In an embodiment, the check valve 64 may be positioned adjacent to the blower 54 so that the blower and check valve span the duct 26' downstream of the intercoolers 32 and radiator 34. When the associated aircraft 14 is at altitude, the intake door 56' may be modulated to an open configuration by control 46, thus allowing air from the ambient 33 to enter the intake opening 28' and flow through the duct 26'. When the exhaust door 60 is modulated to an open configuration by the control 46, thereby opening the exhaust opening 30, ambient air may flow through the duct 26 in the direction of arrows C. Following the path of least resistance, the ambient air may flow across the intercoolers 32 and radiator 34, then through the check valve 64, which may be biased to allow air flow in a downstream direction (i.e., the direction of arrows C), and out the exhaust opening 30'.

In an embodiment, the blower 54 may be locked in a static position, or may be allowed to windmill, or may include louvers that may be shut by the controller 46 so there may be no, or substantially no, air flow through the blower. Again, the controller 46 may modulate the positioning of the intake door 56' and the exhaust door 60 between fully open and closed configurations to vary the flow of ambient air through the duct 26' to provide the desired degree of cooling for the intercoolers 32 and radiator 34.

When the associated aircraft 14 is in a stationary position, such as on the ground, or in a low altitude, low velocity flight, the blower 54 may be actuated by the control 46. In this configuration air from the ambient 33 may be drawn in through the intake opening 28' and follow the direction of arrows D through the duct 26'. The blower 54 may draw ambient air across the intercoolers 32 and radiator 34 and out the exhaust opening 30'. Because the blower 54 may create a backpressure in the terminal segment 65 of the duct 26' downstream of the blower, the pressure differential across the check valve 64 may close the check valve and thus prevent air flow through the check valve in both a downstream and an upstream direction. In an embodiment, the check valve 64 may be configured to prevent air flow in an upstream direction. This backpressure may be aided in part by selective positioning of the exhaust door 60 by the control 46.

As shown in FIGS. 1, 2 and 3, the engine cooling systems 10, 10' may be connected to provide cooling of two discrete cooling systems. The first system may be a cooling system for the engine 38 and may include the radiator 34 connected by the coolant line 36 to the engine.

The second cooling system, generally designated 66 (FIG. 3), may provide conditioned charge air to the intake manifold 67 of the internal combustion engine 38. The system 66 may include a charge air or combustion air intake line 68 that draws air from an air intake 70 that may be formed in the fuselage 12 of the aircraft 14. The air intake line 68 may include a first turbocharger 72 and a second turbocharger 74. Turbochargers 72, 74 may be powered by exhaust gases from the engine 38 traveling through exhaust line 76 that turn turbines associated with the turbochargers. In an alternate embodiment, one or both of the turbochargers 72, 74 may be powered by an electric motor. The intercoolers 32 may be connected to the combustion air intake line 68. The combustion air intake line 68 may include bypass lines 82, 84 connected to divert intake air around intercoolers 78, 80, respectively.

The system 66 may include modulating valves 86, 88 that are connected to the bypass lines 82, 84, respectively upstream of the intercoolers 78, 80 and actuated by control 46. Control 46 may modulate valves 86, 88 to modulate an amount of combustion air diverted around the intercoolers 78, 80 through bypass lines 82, 84, and an amount of combustion air flowing through the intercoolers 78, 80. The system 66 also may include sensors in the form of thermocouples 90, 92 that are configured to determine the temperature of the combustion air in the combustion air intake line 68 and transmit a signal to control 46, which receives the temperature signal from the sensors. In the embodiment shown, thermocouple 90 may be positioned between intercooler 78 and turbocharger 74, and thermocouple 92 may be positioned between intercooler 80 and engine intake manifold 67. Optionally, the system 66 may include a pressure sensor 94, which may be located immediately upstream of the engine intake manifold 67, that may send a signal to the controller 46 representing the pressure of the charge air in the intake line 68 at that point. Optionally, the system 66 may include a thermocouple 96, which may be located on the coolant line 36, that may send a signal to the controller 46 representing the temperature of the coolant flowing from the radiator 34 to the engine 38.

In operation, ambient air 33 may enter through the air intake 70 and travel through the combustion air intake line 68 to the first turbocharger 72, where it may be pressurized and as a result, heat is added to the air. Based upon the amount of heat added to the air and the temperature limit for the second turbocharger 74, either the air travels through the intercooler 78 to be cooled, or a portion or all of the air travels through the bypass line 82. In response to temperature signal readings from thermocouples 90, 92, the control 46 may modulate the amount of combustion air flowing through intercooler 78 and intercooler 80 and the amount of combustion air diverted by valve 86 and valve 88 to bypass lines 82, 84, respectively, around the intercoolers, which may not be cooled.

The ratio of bypass air to cooled air may be determined by comparing the temperature detected by the thermocouple 90 to the maximum permitted inlet temperature of the second turbocharger 74. Combustion air within a preferred temperature range may enter the second turbocharger 74, where it may be further pressurized and consequently heated. Based upon the amount of heat added to the combustion air by the turbocharger 74, the combustion air may flow downstream to the second intercooler 80 where it either passes through the intercooler 32 and is cooled, or some or all of it is diverted by valve 88 to bypass line 84. Again, the bypass ratio may be determined from the temperature and pressure of the air, measured at thermocouple 92 and pressure sensor 94, respectively. The controller 46 may be programmed with selected values for the temperature limit for the engine intake manifold 67, desired intake pressure and desired mass and volumetric flow of combustion air. This combination of intercoolers 78, 80, bypass loops 82, 84, thermocouples 90, 92 and controller 46 may provide optimized cooling to ensure that the combustion air entering the engine intake manifold 67 of the engine 38 may be within a preferred temperature range— no higher than the upper temperature limit and not overcooled.

Overcooling the combustion air may have undesirable repercussions as it may necessitate increased cooling airflow or a larger downstream heat exchanger (the radiator 34 in duct 26 as shown in FIGS. 1 and 2), as well raise the temperature of the cooling air, which may require higher temperature-rated components downstream.

The thermal requirements of the intercoolers 78, 80 and radiator 34 may vary with the altitude of the vehicle, such as aircraft 14, associated with the engine 38, independently of each other and therefore the intercoolers 32 typically may be sized to the largest size with the most demanding thermal load. During altitude operation, turbochargers 72, 74 may be utilized more, which may require a higher thermal load for the intercoolers 78, 80, which may create the sizing point for the intercoolers at altitude. The thermal load for the intercoolers 78, 80 when the vehicle, such as aircraft 14, associated with the engine 38 is not in motion and on ground may be relatively low. However, since the intercoolers 78, 80 may be sized for altitude operation, they may overheat the cooling air in the duct 26 (FIGS. 1 and 2), which may make it more difficult to meet the thermal requirements of the radiator 34.

Because the intercoolers 78, 80 may have combustion air flowing through them at much higher temperatures than that of the engine coolant, they may overheat the cooling air, making it difficult or impossible to cool the radiator 34. However, by using the configuration of the optimized cooling control system 66 shown in FIG. 3, only the required amount of heat may be transferred from the intercoolers 78, 80. This optimization may be effected by providing the bypass lines 82, 84, which may provide combustion air to the engine intake manifold 67 within a preferred temperature range. The thermocouple 96 monitors engine coolant temperature to ensure adequate cooling of radiator 34. Further, with the engine cooling system 10, the control 46 may be configured to modulate the passive flow exhaust door 42 to an open configuration and modulate the motive flow exhaust door 50 to a closed configuration 50A when a vehicle, such as aircraft 14, associated with the engine 38, is in motion; and to modulate the motive flow exhaust door 50 to an open configuration and the passive flow exhaust door to a closed configuration 42A when the vehicle associated with the engine 38 may not be in motion, such as when the aircraft 14 is stationary on the ground.

While the methods and forms of apparatus herein described constitute preferred embodiments of the invention, it is to be understood that the invention may not be limited to these precise forms of apparatus and methods, and that changes may be made therein without departing from the scope of the invention.

What is claimed is:

1. An engine cooling system comprising:
   a housing forming an enclosed duct having an air intake opening;
   at least one heat exchanger positioned within the duct such that ambient air entering the air intake opening contacts the at least one heat exchanger;
   at least one radiator circulating coolant for the engine, the at least one radiator positioned in the duct such that ambient air entering the air intake opening contacts the at least one radiator;
   the duct having an exhaust opening positioned downstream of the at least one heat exchanger and the at least one radiator, such that ambient air flows into the air intake opening, flows through the duct to contact the at least one heat exchanger and the at least one radiator, and exits the duct through the exhaust opening;
   the exhaust opening having a passive flow duct segment and a motive flow duct segment;
   wherein the passive flow duct segment has a passive flow exhaust opening and a passive flow exhaust door for modulating air flow through the passive flow duct segment;
   wherein the motive flow duct segment has a motive flow exhaust opening, a motive flow exhaust door, and a blower, wherein the motive flow exhaust door modulates air flow through the motive flow duct segment and the blower moves air through the motive flow duct segment; and
   a controller that modulates the passive flow exhaust door, the motive flow exhaust door, and the blower such that the controller modulates the motive flow exhaust door to a closed position and the passive flow exhaust door to an open position when the blower is not activated.

2. The engine cooling system of claim 1, wherein the controller modulates the motive flow exhaust door to an open position when the control modulates the passive flow exhaust door to a closed position and the blower is activated.

3. The engine cooling system of claim 2, wherein the controller modulates the passive flow exhaust door closed, modulates the motive flow exhaust door open, and activates the blower when a relative velocity of air flow through the duct is insufficient to provide a desired cooling effect on the at least one heat exchanger and the at least one radiator.

4. The engine cooling system of claim 1, wherein the air intake opening includes a positionable intake door for modulating air flow through the air intake opening.

5. The engine cooling system of claim 4, wherein the controller actuates the intake door.

6. The engine cooling system of claim 1, further comprising a combustion air intake line connected to the engine; and wherein the at least one heat exchanger is at least one intercooler connected to condition combustion air in the combustion air intake line.

7. The engine cooling system of claim 6, wherein the combustion air intake line includes at least one bypass line connected to divert combustion air around the at least one intercooler, and at least one bypass valve connected to modulate an amount of combustion air diverted around the at least one intercooler, and an amount of combustion air flowing through the at least one intercooler.

8. The engine cooling system of claim 7, further comprising at least one sensor configured to determine a temperature of combustion air in the combustion air intake line; and in response to the temperature signal, the controller actuates the at least one bypass valve to modulate the amount of combustion air diverted around the at least one intercooler and the amount of combustion air flowing through the at least one intercooler to provide combustion air to the engine within a preferred temperature range.

9. A vehicle comprising:
   an internal combustion engine;
   a compartment having an enclosed duct;
   the duct having an air intake opening to ambient air and an exhaust opening to ambient air aft of the air intake opening;
   at least one heat exchanger positioned within the duct such that ambient air entering the air intake opening contacts the at least one heat exchanger;
   at least one radiator circulating coolant for the engine, the at least one radiator positioned within the duct such that ambient air entering the air intake opening contacts the at least one radiator;
   wherein the exhaust opening is positioned downstream of the at least one heat exchanger and the at least one radiator, such that ambient air flows in the air intake opening, flows through the duct to contact the at least one heat exchanger and the at least one radiator, and exits the duct through the exhaust opening;
   the exhaust opening having a passive flow duct segment and a motive flow duct segment;
   wherein the passive flow duct segment has a passive flow exhaust opening and a passive flow exhaust door, wherein the passive flow exhaust door modulates air flow through the passive flow duct segment;
   wherein the motive flow duct segment has a motive flow exhaust opening, a motive flow exhaust door, and a blower, wherein the motive flow exhaust door modulates air flow through the motive flow duct segment and the blower moves air through the motive flow duct segment;
   a controller that modulates the passive flow exhaust door, the motive flow exhaust door, and the blower such that the controller modulates the motive flow exhaust door to a closed position and the passive flow exhaust door to an open position when the blower is not activated; and
   wherein the vehicle is selected from an aircraft, a land vehicle, an amphibious vehicle a marine vehicle, and a submarine vehicle.

10. The vehicle of claim 9, wherein the intake opening includes a positionable intake door, and wherein the controller actuates the intake door to modulate air flow through the duct.

11. The vehicle of claim 10, further comprising a combustion air intake line connected to the engine; and wherein the at least one heat exchanger includes at least one intercooler connected to condition combustion air in the combustion air intake line, the combustion air intake line includes at least one bypass line connected to divert combustion air around the at least one intercooler, and at least one bypass valve connected to modulate an amount of combustion air diverted around the at least one intercooler and an amount of combustion air flowing through the at least one intercooler.

12. A method for cooling an engine having a housing forming an enclosed duct having an air intake opening, a passive flow exhaust opening, and a motive flow exhaust opening, the method comprising:
   placing at least one heat exchanger within the duct;
   connecting the at least one heat exchanger to condition combustion air in a combustion air intake line to the engine;
   placing at least one radiator configured to circulate coolant for the engine within the duct;
   modulating an amount of ambient air flowing through the duct to maintain temperatures of the combustion air and the coolant within preferred temperature ranges;
   wherein modulating an amount of ambient air flowing through the duct includes activating a blower to move ambient air through the duct, positioning an air intake door at the air intake opening, positioning a passive flow exhaust door in the passive flow exhaust opening, and positioning a motive flow exhaust door in the motive flow exhaust opening; and
   wherein modulating an amount of ambient air flowing through the duct further positioning the passive flow exhaust door in an open position and positioning the motive flow exhaust door in a closed position when the blower is not activated.

13. An engine cooling system for a vehicle comprising:
   a housing forming an enclosed duct having an air intake opening, the air intake opening including a positionable intake door configured to modulate air flow through the duct;
   at least one heat exchanger positioned within the duct such that ambient air entering the air intake opening contacts the at least one heat exchanger;
   at least one radiator circulating coolant for the engine, the at least one radiator positioned in the duct such that ambient air entering the air intake opening contacts the at least one radiator;
   wherein the duct includes an exhaust opening positioned downstream of the at least one heat exchanger and the at least one radiator, such that ambient air flows in the air intake opening, flows through the duct to contact the at least one heat exchanger and the at least one radiator, and exits the duct through the exhaust opening, the exhaust opening including a passive flow exhaust opening having a positionable passive flow exhaust door configured to modulate air flow through the duct, a motive flow exhaust opening having a positionable motive flow exhaust door configured to modulate air flow through the duct, the motive flow exhaust opening including a blower configured to move air through the duct to the exhaust opening; and
   a controller for modulating one or more of the passive flow exhaust door, the motive flow exhaust door, the blower, and the intake door, the controller modulating the passive flow exhaust door to an open configuration and modulate the motive flow exhaust door to a closed configuration when a vehicle associated with the engine is in motion, and modulating the motive flow exhaust door to an open configuration and the passive flow exhaust door to a closed configuration when the vehicle associated with the engine is not in motion.

* * * * *